United States Patent [19]

Bunch

[11] Patent Number: 4,459,894
[45] Date of Patent: Jul. 17, 1984

[54] MOLD-IN-PLACE SABOT PROJECTILE

[75] Inventor: J. David Bunch, Marion, Ill.

[73] Assignee: Olin Corporation, Stamford, Conn.

[21] Appl. No.: 416,828

[22] Filed: Sep. 13, 1982

[51] Int. Cl.$^3$ .................. C06B 21/00; F42B 33/10
[52] U.S. Cl. ......................... 86/1 R; 102/520; 102/521; 102/526; 102/527
[58] Field of Search ............... 86/1 R; 102/520, 521, 102/526, 527

[56] References Cited

U.S. PATENT DOCUMENTS 3,714,900 2/1973 Feldmann ..................... 102/93
4,360,954 11/1982 Burns et al. .................. 102/521

Primary Examiner—Leland A. Sebastian
Assistant Examiner—Joel P. Okamoto
Attorney, Agent, or Firm—Bruce E. Burdick

[57] ABSTRACT

A method of manufacturing a sabot projectile is disclosed. The projectile core is used as the core pin of a mold and the sabot is molded directly onto and in alignment with the projectile core.

10 Claims, 1 Drawing Figure

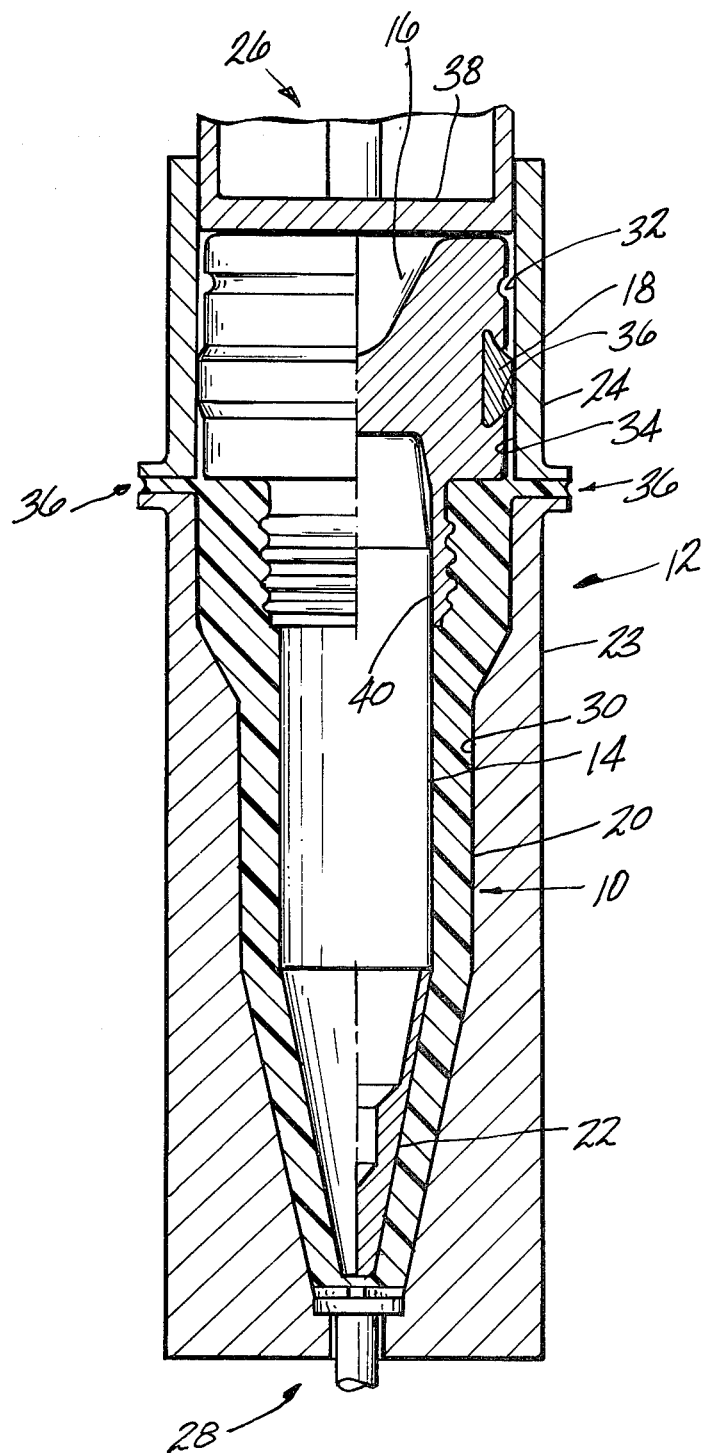

MOLD-IN-PLACE SABOT PROJECTILE

This invention relates to ammunition projectiles with sabots and specifically to process for making such projectiles.

BACKGROUND AND SUMMARY OF INVENTION

The conventional Phalanx ammunition round includes an expensive projectile. The projectile has a heavy metal core ("penetrator") designed to penetrate metallic armour and within a surrounding light plastic sabot designed to allow the penetrator to be fired from a large diameter barrel bore so as to have the propelling pressure act over a bigger area and thus produce a bigger force on the penetrator which in turn gives greater acceleration and ultimately higher velocities to the penetrator. The projectile also has a pusher plug designed to impart spin to the penetrator to enhance penetration and designed to protect the penetrator base from contact by the hot propellant gases during firing. In order to minimize cost, this pusher plug is conventionally aluminum and has a ringshaped rotating band around it to protect the gun barrel from aluminum fouling which might otherwise occur if the aluminum pusher plug were to directly contact the barrel bore. In order to be most effective, it is necessary that the rotating band, penetrator (projectile core), pusher plug and sabot all be aligned with each other, and especially the rotating band and projectile core. If the core and band are misaligned even slightly, the spin-up of the projectile about the axis of the rotating band will result in wobbling of the core and resultant inaccuracy. The conventional Phalanx round has many advantages, but also has one disadvantage. The round tends to wobble down the barrel bore. The importance of such a discovery should not be underestimated. The Phalanx gun is the gun currently used by the Navy to shoot down incoming cruise missiles by firing at rates of 3,000 rounds per minute. Inaccuracy could conceivably lead to the crucial ones of those thousands of rounds missing the target with resultant loss of an aircraft carrier or other extremely vital naval vessel together with its crew. It is a major accomplishment that the present invention has effectively minimized barrel wobble due to the misalignment above noted and has done so at reduced cost, thus allowing for more rounds of better ammunition to be acquired within the same defense budget.

The invention achieves this end by providing a manufacturing method in which the core, sabot, plug and band are all simply, effectively and automatically aligned with each other so that misalignment is effectively eliminated. The invention also allows for an unstressed sabot in contrast to the conventional sabot which is highly stressed when assembled. High sabot stresses before loading and firing are advantageously avoided by the invention thus eliminating conventional misalignments caused by uneven stress-strain properties within the sabot.

BRIEF DESCRIPTION OF DRAWING

The invention will be better understood by reference to the attached drawing in which the FIGURE is a diametrical cross-sectional view taken along the longitudinal axis of a projectile 10 in position for molding within a mold 12.

DETAILED DESCRIPTION

Referring to the FIGURE, projectile 10 comprises a projectile core ("penetrator") 14, a pusher plug 16, a rotating band 18 about the plug 16, a discarding sabot 20, surround core 14 and a projectile nose cover 22, the purposes of which have been described above except nose cover 22 which is aluminum, plastic or other protective material designed to protect the nose of the projectile from abrasion or supersonic heating during flight, especially where the penetrator 14 is made of an incendiary material like depleted uranium. Alternatively cover 22 may be an incendiary material to aid the "burning" action necessary to penetrator armour. Projectile 10 can have any desired external shape such as the exemplary modified Phalanx shape shown.

The sabot 20 of projectile 10 abuts against pusher 16, whereas in conventional Phalanx ammunition there is a gap between the rear (top as shown) of the sabot 20 and the front (bottom as shown) of the plug 16, the size of the gap being a function of the amount of pre-stress on the conventional Phalanx sabot. The invention is applicable to other rounds than the modified Phalanx projectile shown.

Mold 12 comprises a main body 23, an upper alignment body 24, a holder 26 and an ejector 28. Main body 22 has a tapered circular interior cavity wall 30 which has the desired exterior sabot shape. Upper alignment body 24 is a hollow cylindrical body with upper and lower inside walls 32, 34 separated by an upwardly facing interior annular abutment shoulder 36 which is carefully coaxially aligned with the axis of the cavity 30 of main body 22 when bodies 23 and 24 are joined. Wall 32 is of just slightly larger diameter than the outside diameter of band 18 while wall 34 is of a smaller diameter just slightly larger than the outside diameter of the sidewall of pusher plug 16 in front of band 18. Shoulder 36 is downwardly tapered in conformance with the front edge of band 18. The fit between wall 34 and plug 16 and between band 18 and shoulder 36 is preferably tight enough that a minimum amount of molding medium enters the space there between. Bodies 23 and 24 cooperate to define mold openings 36 (preferably four openings spaced 90° apart) therebetween. Bodies 23 and 24 can be a single integral piece if desired. Conventional flow control means and plastic supply, timing, heating means (not shown) would be used to control flow through mold 12. Holder 26 is a simple push cup 38 or other pressure plate means for holding band 18 against shoulder 36 during molding. This holding action, together with the fixed alignment between shoulder 36 and cavity wall 30 results in an aligned band, plug and sabot. Alignment between core 14 and the other components (especially band 18) is achieved by pre-aligned fit between plug 16 and core 14 which is achieved by a jig guaranteeing such alignment or by a high tolerance force fit between a frontal plug recess 40 and core 14. Plug 16 and core 14 can be preassembled as a unit and alignment checked easily since the core 14 is not yet hidden by the sabot 20 at that stage of the process.

With the aligned core, plug and band held in place by holder 26, the molding is accomplished to produce an aligned, unstressed sabot. At this stage it will be appreciated that a major advance over the prior art has been made in that an accurate, uniform and reliable alignment of all projectile components is achieved. Since the sabot is unstressed this alignment is not likely to change and the sabot is not likely to crack prematurely due to unexpected overstressing. The holder 26 is now released and ejector 28 is raised to shove the completed projectile from the mold.

ADVANTAGES OF THE INVENTION

Concentricity (alignment) is assured. The sabot is not a separate component so inspection load is lightened. The sabot is not in a highly prestressed material state as it is when it is assembled conventionally either in "drill and pin" or welded configurations, thus reducing the likelihood of in-field cracking problems. The external configuration has no gap between sabot and pusher plug to collect debris which might later damage a barrel. The molding-in-place process of the invention produces intimate contact between the sabot and the pusher plug to increase joint strength thereby increasing resistance to torque, bending and tensile forces. Also a hermetic seal is provided about the projectile to prevent contamination from or to the projectile core (penetrator). Consistency of sabot separation is improved since the stress levels are uniform and low (resulting on from material shrinkage during mold curing). Regrind plastic (surplus) can be used.

In short, a much better projectile at much less cost is available as a result of the invention.

In view of the substantial benefit to the public to be produced by this invention and in view of its surprising superiority, this invention is to be understood as being quite broadly entitled to a wide range of equivalents in terms of apparatus within the scope of the overall methods claimed below.

What is claimed is:

1. A process for manufacturing a sabot projectile which comprises the steps of:
 A. inserting a projectile core into a pusher plug in alignment with said plug;
 B. inserting said core and plug into a mold in axial alignment with said mold, said core being supported solely by said pusher plug;
 C. molding a unitary sabot about said core while said core is held;
 D. holding said core and plug in said inserted aligned position during said molding; and
 E. removing said core-plug-molded sabot combination from said mold.

2. The method of claim 1, wherein said step A comprises the substeps of:
 (i) providing an aligned cavity in said plug
 (ii) locking said core into said plug cavity.

3. The method of claim 2 wherein said locking is done by force fitting said core into said plug cavity.

4. The method of claim 1 wherein said insertion step B further comprises the steps of:
 (i) providing said mold with an abutment being in a predetermined alignment with said mold cavity, and
 (ii) abutting said pusher plug against said abutment after said core has been inserted into said plug, thereby aligning said plug and core with said mold.

5. The method of claim 4 wherein said holding step C further comprises the step of forcing said pusher plug firmly against said abutment and maintaining during said molding step D force on said pusher plug to maintain said plug against said abutment.

6. The method of claim 5 wherein said pusher plug includes a rotating band about said pusher plug and said band is the portion of said pusher plug which engages said alignment abutment, whereby said band is automatically aligned with the molded sabot during said molding.

7. The method of claim 1 wherein said sabot is molded in a nose-down position in said mold cavity.

8. The method of claim 5 further comprising the steps of:
 (i) providing said pusher plug with a recess adapted to receive a rotating band; and
 (ii) said molding step D includes molding a rotating band into said recess.

9. The method of claim 8 wherein molding step D also includes the step of molding a connecting band between said sabot and said rotating band so that said rotating band, connecting band and said sabot form a single integral molded body.

10. The method of claim 1 wherein said sabot is unstressed during said process.

* * * * *